Dec. 6, 1938.    V. E. FLODIN    2,139,632
ROTARY VALVE OPERATING MECHANISM
Filed Nov. 7, 1936    6 Sheets-Sheet 2
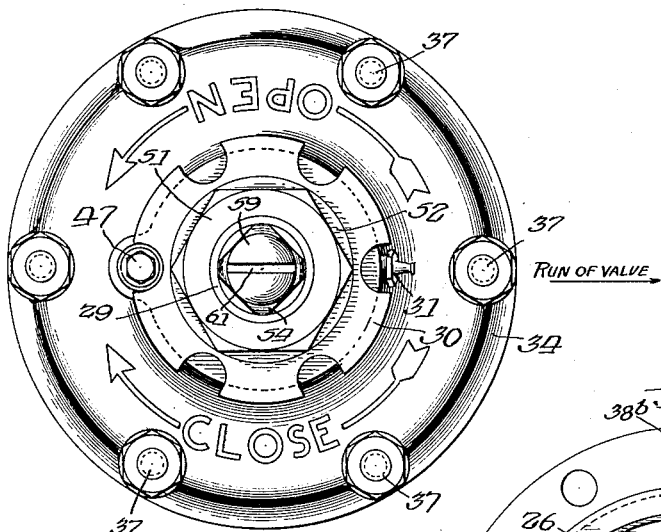
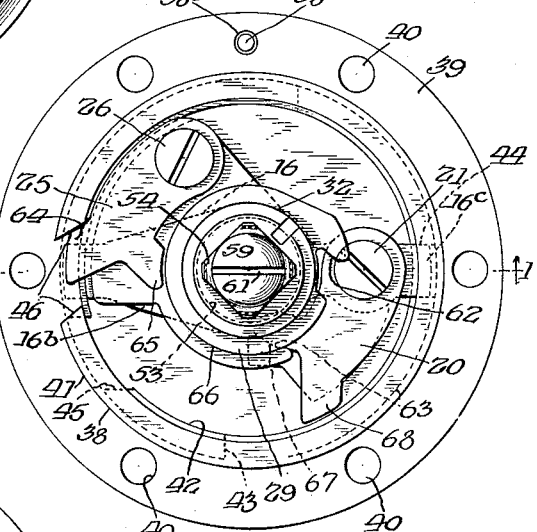
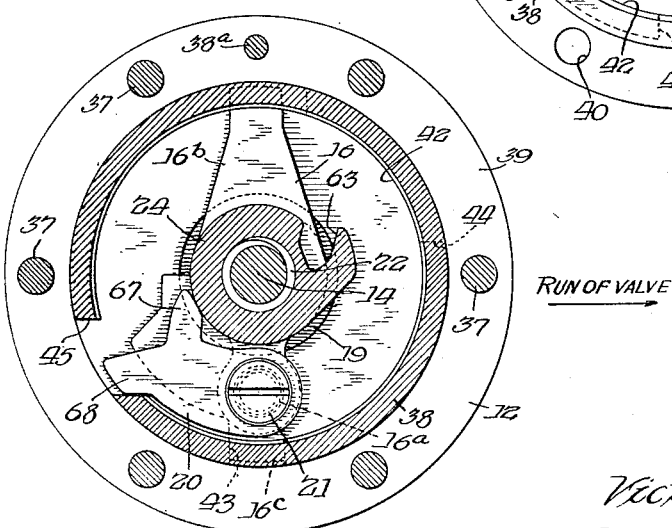
Inventor:
Victor E. Flodin
By Joseph O. Lange
Atty.

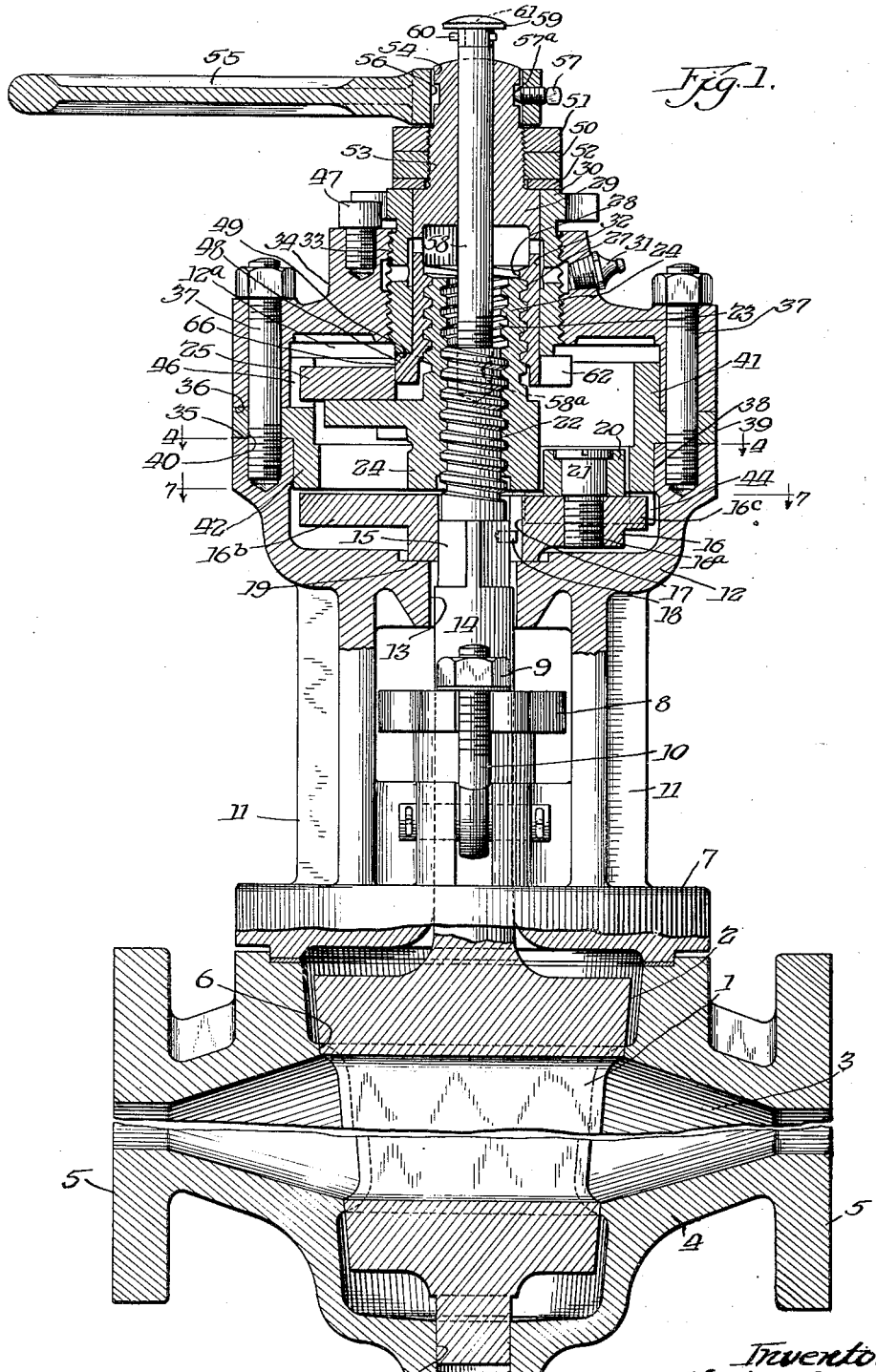

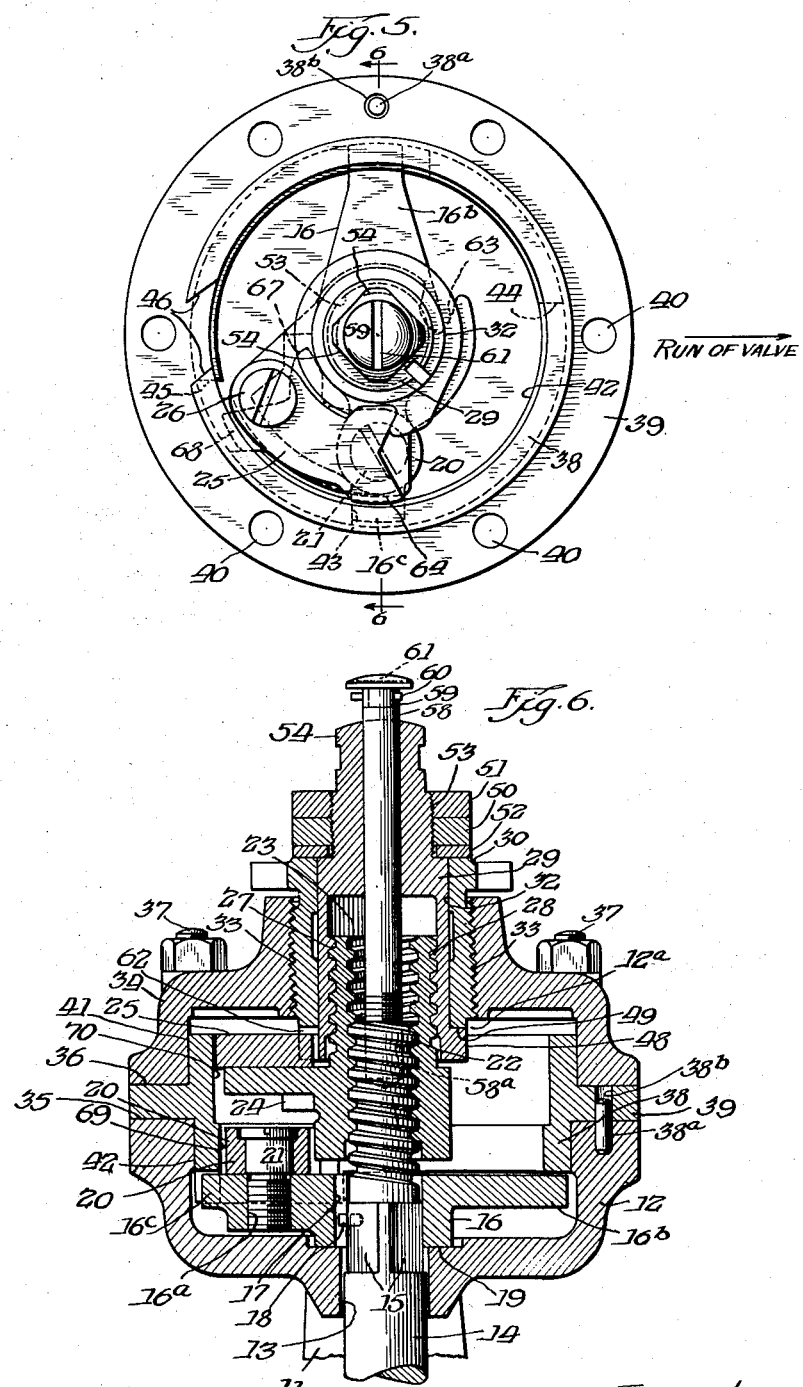

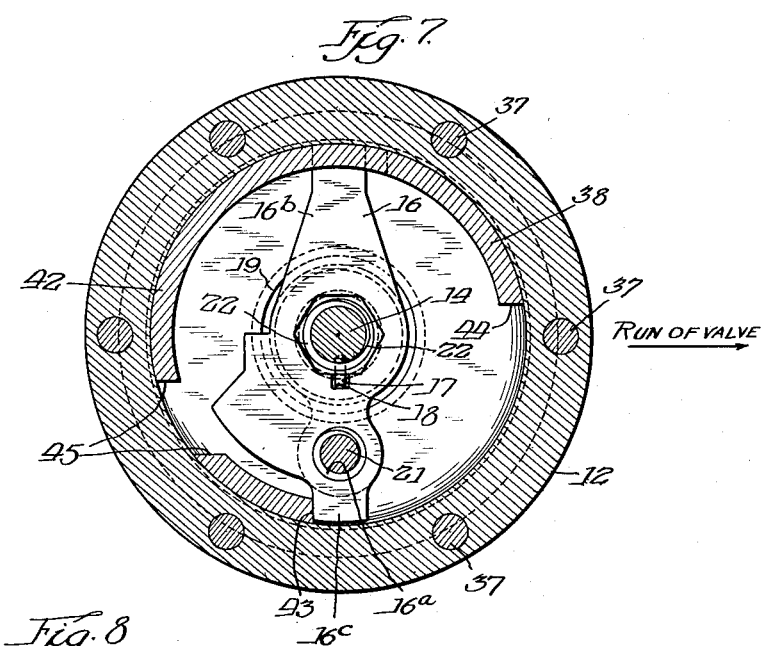
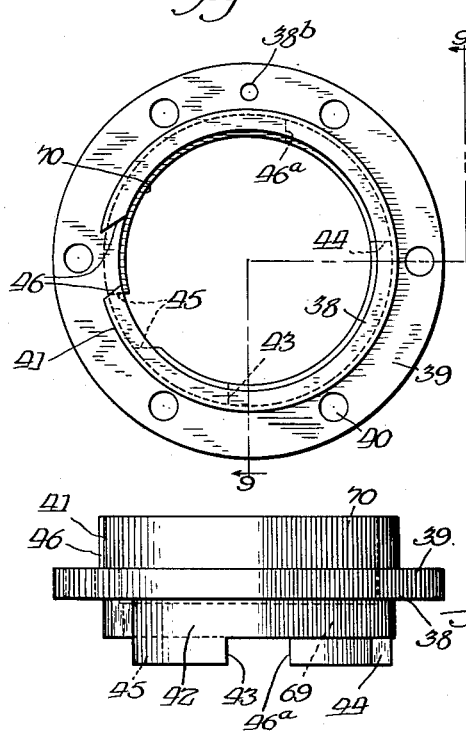
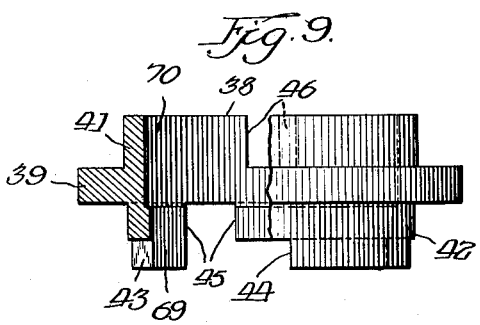
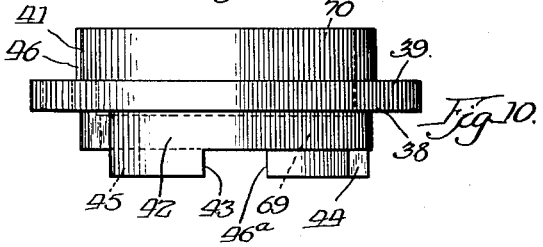

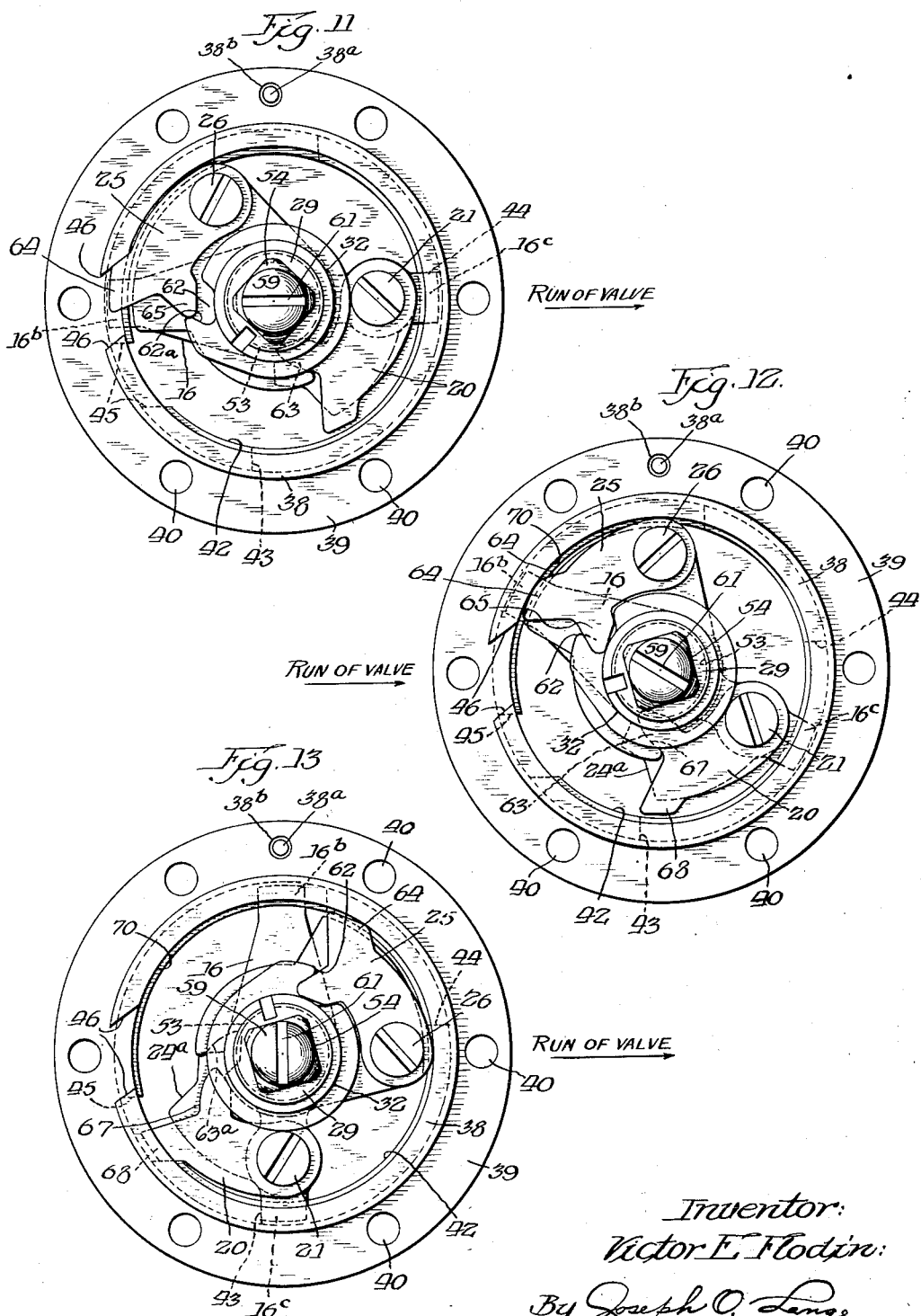

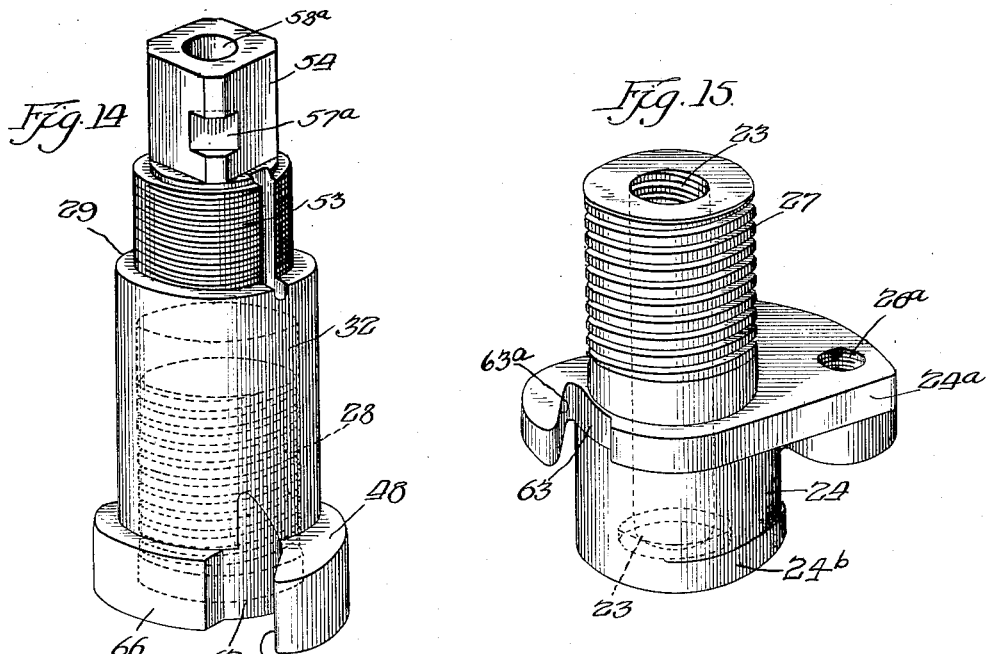
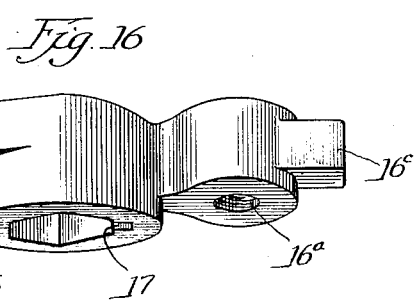
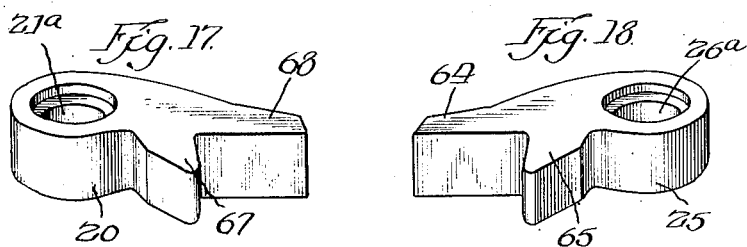

Patented Dec. 6, 1938

2,139,632

UNITED STATES PATENT OFFICE 2,139,632

ROTARY VALVE OPERATING MECHANISM

Victor E. Flodin, Oak Park, Ill., assignor to Crane Co., Chicago, Ill., a corporation of Illinois Application November 7, 1936, Serial No. 109,651

5 Claims. (Cl. 251—97)

This construction relates more specifically to an improvement in the valve operating mechanism useful in the actuation of plug valves, rotary valves and the like wherein it is desirable to obtain easy, free operation without the objection of scoring or abrading the respective surfaces of the plug or casing or both and, at the same time, to avoid the accumulation of objectionable line sediment between the respective contact surfaces of the plug and casing or beneath the plug while the valve is in either open or closed position.

There have been numerous existing constructions in the past which provided various means for lifting the valve closure or plug before the actual rotation thereof, but so far as I am aware all of these prior mechanisms permitted the valve closure member or plug to be seated in the valve casing only during the closed position of the valve closure member. It has been found that under such circumstances, however, the construction introduced difficulties to the effect that when the plug was permitted to remain in its open position and therefore was slightly displaced or unseated from the seat provided within the casing for any considerable length of time, sediment, scale and foreign matter within the pipe line accumulated within even the relatively slight clearances provided between the plug and the seat of the casing to such extent as to cause the valve plug either to bind or stick or to become so badly scored during the course of subsequent operation that it ultimately resulted in the valve refusing to seat either in the closed position or else causing the seat to become so badly scored, abraded or torn so that objectionable line leakage therepast occurred.

Further, it has been found in numerous instances that the solid matter which is frequently carried in suspension in the pipe lines, as for example in paper making processes or in oil cracking lines and the like, formed a sufficiently heavy accumulation between the plug proper and the lower portion of the casing or body so that seating the plug properly or even altogether in the closed position was prevented, obviously rendering the valve virtually useless as a positive shut-off device.

By the construction forming the subject matter of my invention, however, a mechanical construction has been devised which embodies the important advantage of being able to seat the valve plug or closure member in the open position of the valve as well as in its closed position, preferably accomplishing such result by a single or continuous direction of rotation of the operating handle, so that the seat within the casing as well as the bearing surface of the closure member or the plug is thus protected against exposure to the line fluid or to the sediment being carried and further rendering it substantially impervious to atack by fluid abrasion, wear and the like. Accordingly, the life of the valve has been prolonged considerably.

Heretofore, whenever it has been desired to seat the valve closure member in the open as well as in the closed position, it has been the general practice to provide two sets of operating levers in order to accomplish the respective lifting or seating and the rotation of the closure member, so that the operator of necessity was required to manipulate each lever in order to accomplish a result obtained by my invention by means of a single lever, with a direction of rotation for closing and opening the valve in a clockwise and counter-clockwise direction, respectively. Heretofore, also coiled springs, track cams, or pins have been used to seat the plug or closure, but obviously these constructions have had serious limitations as to the type of service involved, particularly considering high temperatures and excessive pressures and the objectionable effect upon the materials and the otherwise relatively delicate construction.

An important object of this construction lies in the provision for a construction which not only seats the plug or closure member in both open and closed positions but employs means whereby the actual amount of lift of such closure member in either opening or closing or both can be accurately adjusted to suit the line conditions of the installation, as for example, if the valve is installed on a steam line which might be relatively free of suspended sediment, the lift or clearance between the plug or casing can be made correspondingly greater than what might be practical or acceptable on a line in which the presence of foreign matter or matter in suspension presents a considerable problem.

Another important object is to obtain a positive indicator on the plug showing at all times the position or direction of the port in the plug with relation to the casing ports regardless of the position of the operating handle.

Another important object is to provide for a durable and relatively simple construction which is capable of being totally enclosed so as to be free from attack by dirt and dust and which also lends itself to easy and thorough lubrication for the prevention of excessive wear in the operating or moving parts.

Other important objects and advantages will become more readily apparent upon referring to the accompanying drawings in which Fig. 1 is a sectional assembly view of the operating mechanism embodying my invention applied to a rotary valve in which the valve plug or closure is shown in its open position with respect to the line flow and in leak-proof contact with the valve casing or body, the section of the operating mechanism being taken on the line 1—1 of Fig. 3.

Fig. 2 is a plan view of the operating mechanism enclosure or cover showing the lift adjusting locking means and the indexing arrangement in plan to indicate the open and closed positions of the valve.

Fig. 3 is a plan view of the upper structure containing the operating mechanism, with the cover removed and showing the relation of the parts when the valve plug is in the open position described in Fig. 1.

Fig. 4 is a fragmentary plan sectional view taken on the line 4—4 of Fig. 1, showing the slotted or relieved arrangement of the indexing cam whereby during the course of rotation of the operating handle, the respective movements of the internal locking means of the operating mechanism hereinafter to be described are controlled. In this view, the cam locking mechanism and the rotating mechanism have been rotated 90 degrees and with the plug in closed and seated position.

Fig. 5 is a plan view with the cover removed showing the relative positions of the upper pawl arm and upper pawl when the valve plug or closure is in closed and seated position with relation to the casing or body that is also rotated clockwise at 90 degrees to the position described in Fig. 1.

Fig. 6 is a fragmentary sectional view of the operating mechanism in which the plug is in the position described in Fig. 5, i. e., closed and seated, the section being taken on the line 6—6 of Fig. 5.

Fig. 7 is a fragmentary plan sectional view taken on the line 7—7 of Fig. 1, showing the lower pawl arm in contact with the stop upon the locking cam whereby the valve plug is in closed and seated position and in which the locking cam and the rotating mechanisms are in the position described in Fig. 4.

Fig. 8 is a plan view of the cam previously referred to, which by means of upper and lower slots and cut-away sections hereinafter described in detail provides for the necessary stops for limiting the rotation of the plug or closure member in addition to controlling the sequence in which the movements are made when the upper and lower pawls or detent means and the respective pawl arms are rotated during the course of their turning by the actuation of the operating lever.

Fig. 9 is a fragmentary sectional view of the locking cam taken on the line 9—9 of Fig. 8.

Fig. 10 is a front exterior view of the locking cam, showing the lower limiting stops for governing the rotation of the plug.

Figs. 11, 12 and 13 are plan sequential views of the operating mechanisms showing the respective relative positions of the upper pawl, upper pawl arm and operating nut (Fig. 11) when the valve plug is in open position and about to be unseated (Fig. 12) when the plug has been raised from seating contact with the casing and is rotating toward closed position, and (Fig. 13) when the valve plug is in closed but unseated position, respectively.

Fig. 14 is a plan perspective view of the actuating nut showing the cam surfaces or projections and grooves whereby the indexing or locking movement of the upper and lower pawls is controlled.

Fig. 15 is a plan perspective view of the upper pawl arm whereby axial movement of the plug to either seat or to unseat when in its open position is accomplished by means of its male threads, while axial movement of the plug to either seat or to unseat when in its closed position is accomplished by means of its female threads. Obviously this arrangement may be reversed, if desired.

Fig. 16 is an underside perspective view of the lower pawl arm.

Fig. 17 is a plan perspective view of the lower pawl or detent.

Fig. 18 is a plan perspective view of the upper pawl or detent.

Throughout the various views, similar numerals refer to similar parts.

Referring now to Fig. 1, the valve is shown in its open position in which position, the conventional ports 1 of the plug or closure member 2 are complementary to the casing ports 3 so as to form a substantially unbroken passage within the valve casing 4, the plug being supported against excessive axial displacement by the lower bearing support 4a. The body or casing 4 is provided with the usual connecting members or flanges 5 which may, of course, be screwed or hub end types also, as desired. It will be noted that while in this position of rotation, the valve plug or closure member 2 forms a leak-proof contact with the preferably raised seating faces 6 of the valve casing, and therefore before rotating the plug or closure member to its closed position, it is necessary, in order to avoid abrasion or scoring, to initially lift or raise the plug directly upwardly so as to break the contact promptly with the seats of the casing and thus allow the plug to be freely rotatable insofar as rubbing or dragging against the seating surface 6 is concerned.

Continuing further with the general description of the device, serving as a closure for the upper open portion of the valve body or casing the valve bonnet 7 is positioned as shown, the bonnet being attached thereto by bolts (not shown) and is provided with the usual stuffing box gland 8 in which the compression of the packing therein is accomplished by means of the tightening down of the nuts 9 upon the studs 10. The bonnet 7 is provided with the usual yoke posts 11 which also support the preferably integral enclosure 12, having a central aperture 13, through which the plug extension or stem 14 projects. The stem is provided adjacent to its upper threaded extremity with the square or polygonal end 15 over which is placed the lower pawl arm 16 having a similarly formed aperture to receive the polygonal end 15. In order to insure the location of the lower pawl arm 16 in proper axial position with respect to the polygonal portion 15 of the stem 14, a small pin 18 is used fitting within the groove 17 of the lower pawl arm 16. It is obvious that if through error the pawl arm were not properly placed axially with respect to the stem or plug, the latter members could not be rotated for the necessary 90 degrees of travel in opening and closing the valve. The lower pawl arm 16 is supported within the enclosure 12 upon the recessed shoulder 19, but it is upon the actuating nut or collar 29 that the load is placed when the plug is lifted from its seat within the casing by the respective movements of the upper and lower pawls and pawl arms, hereinafter to be described.

Pivotally mounted upon the lower pawl arm 16 and also thereby supported, the lower pawl 20 is held in position by the vertical cap screw 21. Above the polygonally formed portion 15 the stem 14 is provided with a threaded end portion 22, which engages similar threads 23 within the upper pawl arm 24. The threads 22 and 23 upon the stem and lower pawl arm, respectively, serve to raise or lower the valve plug 2 in its closed position and which is 90 degrees from the position shown in Fig. 1.

The upper pawl arm 24 riding upon the stem threads 22 in a manner similar to that described for the lower pawl 20 and lower pawl arm supports the upper pawl 25, the manner of support being more clearly shown in Fig. 3, as by the cap screw 26. Exteriorly, the upper pawl arm 24 is provided with the male threads 27, which likewise engage similar female threads 28 of the operating nut 29. The latter mentioned threads (27 and 28) are threaded oppositely insofar as pitch is concerned to those previously described in connection with the stem and the internally threaded portion of 23 of the upper pawl arm 24, and thereby serve to seat the plug 2 in its open position, as shown in Fig. 1.

Thus it is evident that by the use of two sets of threads functioning to give axial movement in two directions to the plug or closure 2, as distinguished from rotation, the plug may be raised from its seat 6 or else forced to its seat within the casing 4, whether in open or closed position, since each set of threads will function both to seat and to lift the plug, depending upon the direction of rotation in which the operating lever is turned.

Continuing with the general description, the actuating nut 29 is journalled within the adjusting screw 30 so as to rotate freely, regardless of either condition, that is whether the entire assembly comprising the plug, pawls and pawl arms is to be rotated, or whether by reason of a predetermined locking of the upper pawl arm 24, for reasons hereinafter described, the latter remains non-rotatable and then becomes axially movable upon the threads 27. To obtain such free movement with a minimum amount of friction, a lubricant cup or connection 31 is preferably used to lubricate the bearing surface 32 and also the threads 28.

An important element of the invention lies in the fact that the adjusting screw 30, being locked against subsequent rotation by the screw 47, controls the amount of movement to which the plug can be lifted from its seat within the casing by determining the extent of its projection within the enclosure cap or cover 34. Such adjustment further determines just how much the upper pawl arm 24 may be permitted to rise upon the threads 28 before the upper pawl 25 becomes engaged with the operating nut 29 during the course of operation, as hereinafter described.

Having for its purposes the predetermination of the limits of rotation of the plug and also the sequence and amount of pivotal movement of the upper and lower pawls, the cam member or indexing means 38 is fixedly positioned between the upper face 35 of the enclosure 12 and the lower face 36 of the cover 34, and held tightly therebetween against rotation and axial movement by the bolt studs 37. As more clearly shown in the detailed Figs. 8 to 10, inclusive, the cam 38 is provided with a median flange portion 39 having holes which for positioning upon the enclosure 12, preferably coincide with the spacing of the bolts 37. The lower part of the lower rim portions 42 of the cam 38 is provided with the cut-out or slotted portion which serves as rotational limits or stops 43 and 44 and defines the 90 degree rotatable movement of the plug 2 by virtue of limiting the rotatable movement of the lower pawl arm 16, since the latter, as previously explained, is keyed to the polygonal portion 15 of the plug stem 14.

Immediately below the median flange 39 on the lower rim 42 of the cam, a cut-away portion 45 provides for the limiting of the pivotal movement of the lower pawl 25, as hereinbefore described.

The upper rim 41 is likewise cut-away as at 46 to provide the necessary outward pivotal movement of the upper pawl in a manner similar to that provided for the lower pawl, the rotative and pivotal movements of both detents being hereinafter described in detail.

Similarly, provision is made in proper sequence for the engagement and disengagement of the lower pawl 20 when the plug 2 is in its open and seated position as shown in Fig. 1, at which time the toe 67 of the lower pawl 20 engages the groove 63 of the upper pawl arm 24, while the heel 68 of the lower pawl 20 is in sliding contact with the lower internal peripheral surface 69 of the indexing cam 38. The toe 64 of the upper pawl 25, after a predetermined rotative movement of the actuating nut 29 in a clockwise direction, will be withdrawn from the relieved portion or slot 46 and then it commences to move along arcuately within the limits prescribed by the upper internal peripheral surface 70 of the cam 38. At this time, both upper and lower pawls serving as locking members now being released, permit the rotation as a unit of the entire assembly, comprising the plug, stem, collar or lower pawl arm, pawls, and the actuating nut.

Directing attention again to Fig. 1, the lift adjusting screw 30 after being properly set to allow the predetermined amount of lift of the plug is securely locked in position by means of the screw 47. The actuating nut 29 is provided with a lower shoulder 48, which abuts against the lower face 49 of the adjusting screw 30, being pulled up tightly thereagainst by means of the locknuts 50 and 51 and also by reason of the threads 53 bearing against the washer 52. The length of the bearing 32 of the actuating nut 29 is thus determined accurately for establishing the proper operating clearance.

Above the upper locknut 51, the actuating nut 29 is provided with a polygonal end or square 54, over which the handle 55 having a similarly shaped aperture 56 is placed in non-rotatable relation therewith, being held securely thereto by the setscrew 57.

Threadedly mounted within the upper end of the plug stem 14, the indicator stem 58 is positioned, having at its upper limit a slotted button head 59 non-rotatably attached thereto by means of the cotter pin 60. The purpose of the slot 61 and its fixed position with respect to the stem lies so that at all times it indicates to the operator the direction of the flow port 1 of the plug 2, regardless of the rotative position assumed by the operating lever 55, since the rotative direction of the latter will vary considerably depending upon the amount of the lift of the plug, in contradistinction as to whether the plug is in its open or closed position. This is opposite to the usual provision in valve practice that the operating lever handle also serves as an indicator of the direction or position of the flow port of the plug.

Thus by my invention, it will be apparent that a construction for lifting and lowering a valve plug or closure has been provided by using means preferably employing two sets of threads in which each set is called into operation independent of the other but dependent upon the movement of the upper and the lower pawl arms. Each of the latter have pawls pivotally mounted thereon so that upon rotation of the pawl arms, an indexing cam controls the time at which such pivotal movement of the pawls occurs and also establishes the amount of arcuate movement of each upon being carried by the rotation of the respective upper and lower pawl arms.

In addition to controlling the outward pivotal movement of the upper and lower pawls, provision has also been made for controlling their respective inward pivotal movement, for without such provision it would not be possible to rotate the plug from closed to open position or vice versa. Therefore, the vertically extending niches or grooves 62 in the actuating nut 29 (see Fig. 14) and the groove 63 in the upper pawl arm (see Fig. 15) are provided for engagement by the upper pawl 25 and the lower pawl 20, respectively, for the purpose above set forth.

As shown more clearly in Figs. 11 to 13 inclusive, in rotating the plug 2, say from open to closed position, the heel 64 of the upper pawl 25 engages the slot 46 when the plug 2 is in the open and seated position shown in Fig. 3, while the toe 65 bears against the peripheral surface 66 upon the actuating nut 29, which thus allows the latter to thereby rotate independently of the upper pawl 25. However, it should also be noted that since the upper pawl arm 24 by reason of the aforementioned locking engagement of the upper pawl 25 with the slot or groove 46 of the non-rotatably mounted cam 38 cannot be rotated, then for the same reason the lower pawl arm 16 also cannot be rotated, for at this stage of the valve operation (valve open and seated) the lower pawl 20, supported by the lower pawl arm engages the slot 63 of the upper pawl arm 22 and is thereby locked against rotation, the lower pawl 20, by reason of the pin 21 threadedly mounted within the tapped hole 16a (Fig. 16) is pivotally attached to the lower pawl arm 16, but since the lower pawl cannot be rotated, the pin 21 likewise prevents relative movement between the lower pawl and the lower pawl arm (see Fig. 3). It follows further that since the lower pawl arm 16 is keyed or is non-rotatably mounted to the integral stem 14 of the plug 2, the valve plug also cannot be rotated to a closed position at this period of operation and the while rotating the handle 55.

Therefore, it is evident that upon the initial movement of the operating handle occurring in a clockwise direction, only the actuating nut 29 rotates, and its rotation occurs upon the threads 27 of the stationary or non-rotatably locked upper pawl arm 24, thus causing the latter to travel upon the pitch of the rotating threads 28 of the actuating nut and to lift the assembly comprising the plug 2, stem 14, indicator stem 58, in addition to the upper pawl arm 24, while the actuating nut 29 remains substantially stationary axially during rotation by reason of the close clearance maintained between the surfaces of the respective bearings 49 and the underside of the washer 52.

This lifting of the plug continues until, as shown in Fig. 11, the predetermined lift permits the slot 62 of the actuating nut to be rotated around from the position shown in Fig. 3 to the rotated position shown in Fig. 11.

All during this range of rotation, the heel 64 of the upper pawl 25 has had positive engagement with the cam 38 at the upper slotted portion 46 as shown in Fig. 11. At this stage of rotation, the notch 62 has been moved around so that its inner edge 62a contacts with the toe 65 of the upper pawl 25, the latter by such inclined contact afforded by the surface 62a is moved pivotally inward thereby permitting the heel 64 to become slidably disengaged from the slot 46. At the same time, the toe 65 by reason of being moved pivotally inward upon the pin 26 engages the slot 62 of the nut 29, thus permitting the toe 65 to clear the peripheral surface 70 of the cam 38 as shown in Fig. 12.

As the rotation of the actuating nut 29 is continued in its clockwise direction, the upper pawl 25 is rotatably carried or pushed ahead by the actuating nut. Since the upper pawl 25 is pivotally attached by the pin 26 to the upper pawl arm 24, it follows also that relative rotation between the actuating nut 29 and the upper pawl arm 24 immediately ceases, and at this time the plug or closure member is no longer being lifted axially upon the threads 28, but at this stage actual rotation of the plug itself from open to closed position occurs. Further, it is evident that since the upper pawl arm 24 is now free to rotate because its pawl or detent has been released, similarly the lower pawl 20, without however becoming disengaged from the slot 63, will commence to rotate.

At this stage of operation the actuating nut, the upper pawl, the upper pawl arm, the lower pawl and the lower pawl arm are moving together rotatively as a unit. Thus the lower pawl arm 16 pivotally carrying the lower pawl 20 describes an arcuate movement of 90 degrees, that is, from the lower stop or shoulder 44 to the stop 43 of the cam 38 which thereby measures the rotative movement of the plug from open to closed position, the stop 43 preventing further rotative movement of the lower pawl arm. At this point, as shown in Fig. 13, because the lower pawl arm can be rotated no further due to having reached the indexing stop 43, the actuating nut continues to rotate independently, and in so doing forces the toe 67 of the lower pawl 20 which has heretofore been in engagement with the slot or niche 63 of the upper pawl arm 24 outwardly from the said slot 63, the pin 21 serving as the centering means by which the said pivoting occurs. This release of the toe 67 from the slot 63 now allows the upper pawl arm 24 to rotate independently of the stem 14 thus forcing the latter by reason of the movement upon the female threads 23 within the upper pawl arm 24 engaging the male threads 22 of the stem 14 to be moved downwardly toward the casing seat 6 and thereby cause the valve plug or closure to be seated in leak-proof contact with the casing. As shown in Fig. 13, the valve plug is in the closed position, but the above described rotation of the upper pawl arm independently of the stem 14 is about to take place and the plug therefore has not yet been seated or lowered as described. As also true in the case of lifting the plug, the degree of rotation of the pawl arm will vary and depends directly upon the amount of predetermined lift established for the plug.

During the rotative movement of the closure member or plug from closed and seated position to the open and seated position, the procedure or mechanical sequence of the operating mechanism is reversed in accordance with the following description.

Let it now be assumed that the valve plug 2 is in the closed and seated position, in which case the pawls and pawl arms occupy the relative positions disclosed in Figs. 5 and 6. In this setting of the plug, the heel 68 of the lower pawl 20 engages the lower positioned slot 45 of the cam 38, while the toe 67 of the lower pawl is in slidable contact with the peripheral surface 24b of the upper pawl arm 24. At this stage of rotation, the toe 65 of the upper pawl 25 is in engagement with the slot 62 of the actuating nut 29, while the heel 64 is in slidable contact with the upper inner peripheral surface 70 of the cam 38. Upon turning the operating handle of the valve in a counter-clockwise direction (when looking down upon the valve) in order to open the valve, the lower pawl 20 and also the lower pawl arm 16 therefor remain non-rotatable due to the lower pawl being fixed to the lower pawl arm 16 by reason of the pawl being pivotally mounted upon the pin 21. However, the actuating nut 29 rotating together with the upper pawl 25 and the upper pawl arm 24 continues to rotate until, as shown in Fig. 13, the inner cam-like surface 63a of the slot or opening 63 of the upper pawl arm 24 strikes against the toe 67 of the lower pawl 20. When this action occurs the lower pawl 20 being drawn pivotally inward, the heel 68 of the lower pawl is likewise drawn inward, and thus leaving or disengaging the slot 45 of the cam 38. Prior to this taking place, only the operating nut 29, the upper pawl arm 24 and the upper pawl 25 have been rotating together. However, by such rotation of the upper pawl arm, the stem 14 is rendered non-rotatable at this stage by means of its threads 22 moving upon the pitch provided by the threads 23 of the upper pawl arm, the plug is lifted or moved away from the seat in the casing. The parts now assume the relation shown in Fig. 12, and by this positioning all parts are again moving together as during the closing movement, the stop 16c moving away from the abutment 43 (Fig. 13) to the abutment 44 of the cam 38, thereby describing the 90 degree rotation of the plug from closed position and returning to the closed position with relation of parts shown in Fig. 11. As indicated, the upper pawl heel 64 engages the upper slot 46 which thereby releases the toe 65 from its engagement with the slot 62 of the nut 29, thus permitting the latter to rotate upon its threads 27 and by such roation forcing the plug again to its seating contact within the casing thus completing the cycle of operation to open and seated position.

As previously described, the stops 43 and 44 of the indexing cam 38 prevent the plug from rotating any further in the open and closed positions, respectively, the stop 43 acting so in the closing movement by engaging the lug 16c of the lower pawl arm 16, the said lug serving as the stop for both open and closed positions.

Obviously, the correct axial positioning of the cam 38 with its several peripherally arranged notches or grooves is important in order that the detents or pawls and pawl arms may be given the required movement at a definite predetermined time during the rotation of the handle. To assure such accurate positioning, the cam 38 is provided with the aperture 38b which engages the pin 38a, as shown in Fig. 3.

In order to give improved balance to the lower pawl arm 16, a shank extension 16b is preferably provided, although not absolutely required, and in order to assure of the upper and lower pawls being freely pivotable upon their respective pins 21 and 26, the pawls are provided with the shouldered apertures 26a and 21a, as more clearly shown in Figs. 18 and 17, respectively.

It will be apparent from the illustrative form of the invention above described that numerous modifications in the structure may be made without departing from the spirit of the invention.

I claim:

1. In combination with a valve of the rotary plug type having a threaded valve stem for the plug thereof, actuating mechanism for the said valve comprising superposed means consisting respectively of an actuating threaded member and upper and lower pawl arm members, the latter members being concentrically mounted relative to the axis of rotation of the said stem and serving to rotate the said stem in a direction for moving the said plug to open and closed positions, a portion of the said stem being threadedly journaled within the said upper pawl arm member, pivotally mounted detent means upon each of the said pawl arm members for holding the said valve plug against rotation in the opposite direction effective at only those circumferential positions at which the valve plug is in either a maximum opened or closed position, an annularly disposed, immovably mounted indexing member being engageable by one of the said detent means at the open position of the said valve plug, and by the other of the said detent means at the closed position of the said valve plug.

2. In combination with a valve of the rotary plug type having a threaded valve stem for the plug thereof, actuating mechanism for the said valve comprising superposed means consisting respectively of upper and lower pawl arm members, the latter means being concentrically mounted relative to the axis of rotation of the said stem and serving to rotate the said stem in a direction for moving the said plug in opposite directions of rotation to open and closed positions, enclosure means for the said superposed means independent pivotally mounted detent means upon each of the said pawl arm members for restraining the said valve plug against rotation in the opposite direction effective at only those circumferential positions at which the valve plug is in either a maximum opened or closed position, threaded means cooperating with each of said independent detent means for imparting axial movement to the said valve stem for seating and unseating the said valve plug when the latter is restrained against rotation by said detent means, annularly disposed, fixedly mounted indexing means supported by the said enclosure means, each of the said detent means being respectively carried by the said pawl arm members, one of the said detent means engaging the said indexing means in the open position of the valve, the other of said detent means engaging the indexing means in the closed position of the valve.

3. In combination with a valve of the rotary plug type having a threaded valve stem for the plug thereof, threaded means comprising a portion within which the said stem is journaled, actuating mechanism for the said valve comprising relatively pivotable superposed upper and lower pawl arm members and detent means for imparting a combined rotative and axial movement to the said valve stem and the said threaded means to open and close the said valve, fixed indexing means cooperating with the said pawl arm members and detent means for holding the said plug against rotation while in its seated position and while being moved axially to and from its seated position, the said threaded means comprising separate sets of threads cooperating with the said stem to the extent that in imparting the said axial movement to the stem each set operates independently of the other but in which such effect of each is dependent upon the movement of said pawl arm members as defined jointly by the detent means of the said fixed indexing means.

4. In combination with a valve of the rotary plug type having a threaded valve stem for the plug thereof, actuating mechanism for the said valve comprising superposed means consisting respectively of an actuating threaded member and upper and lower pawl arm members, the latter members being concentrically mounted relative to the axis of rotation of the said stem and serving to rotate the said stem in a direction for moving the said plug to open and closed positions, the said stem being journaled within the said upper pawl arm member and being provided with indicator means showing the valve position, a plurality of pivotally mounted detent means carried upon the said superposed means for holding the said valve plug against rotation in the opposite direction effective at only those circumferential positions at which the valve plug is in either a maximum opened or closed position, an annularly disposed, immovably mounted indexing member being engageable by one of the said detent means at the open position of the said valve plug, and by another of the said detent means at the closed position of the valve plug.

5. In combination with a valve of the rotary plug type having a valve stem for the plug thereof, actuating mechanism for the said valve comprising superposed means consisting respectively of upper and lower pawl arm members, the latter means being concentrically mounted relative to the axis of rotation of the said stem and serving to rotate the said stem in a direction for moving the said plug to respective open and closed positions, enclosure means for the said superposed means, a plurality of independent pivotally mounted detent means carried upon said superposed means for restraining the said valve plug against rotation in the opposite direction effective at only those circumferential positions at which the valve plug is in either a maximum opened or closed position, the said actuating mechanism including threaded means cooperating with each of the said independent detent means for imparting axial movement to the said valve stem for seating and unseating the said valve plug when the latter is restrained against rotation by said detent means, annularly disposed, fixedly mounted indexing means cooperating with the said enclosure means, one of the said detent means engaging the said indexing means in the open position of the valve, the other of said detent means engaging the indexing means in the closed position of the valve, whereby upon predetermined rotative movement and subsequent positioning of the said enclosure means the said indexing means may be positioned to permit the desired movement of the said detent means.

VICTOR E. FLODIN.